(12) United States Patent
Boyen et al.

(10) Patent No.: US 9,511,845 B2
(45) Date of Patent: Dec. 6, 2016

(54) AIRCRAFT FRAME

(71) Applicant: Airbus Operations GmbH, Hamburg (DE)

(72) Inventors: Magdalena Boyen, Metten (DE); Wolfgang Eilken, Hamburg (DE); Wolfgang Schulze, Hasloh (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 115 days.

(21) Appl. No.: 14/163,406

(22) Filed: Jan. 24, 2014

(65) Prior Publication Data

US 2014/0209743 A1 Jul. 31, 2014

Related U.S. Application Data

(60) Provisional application No. 61/756,038, filed on Jan. 24, 2013.

(30) Foreign Application Priority Data

Jan. 24, 2013 (EP) ..................................... 13152586

(51) Int. Cl.
*B64C 1/06* (2006.01)
*B29C 67/00* (2006.01)
*B64C 1/10* (2006.01)

(52) U.S. Cl.
CPC ............ *B64C 1/061* (2013.01); *B29C 67/0051* (2013.01); *B64C 1/064* (2013.01); *B64C 1/069* (2013.01); *B64C 1/10* (2013.01); *Y10T 29/49826* (2015.01)

(58) Field of Classification Search
CPC ............ B64C 1/069; B64C 1/068; B64C 1/06; B64C 1/064; B64C 1/061; B64C 1/10
See application file for complete search history.

(56) References Cited

U.S. PATENT DOCUMENTS 2,387,219 A * 10/1945 Wallis ..................... B64C 1/069
244/117 R
2,405,643 A 8/1946 Crot
(Continued)

FOREIGN PATENT DOCUMENTS

CN 102666273 A 9/2012
GB 524721 A 8/1940

OTHER PUBLICATIONS

Kobryn, P.A.; Ontko, N.R.; Perkins, L.P.; Tiley, J.S. (2006) Additive Manufacturing of Aerospace Alloys for Aircraft Structures. In Cost Effective Manufacture via Net-Shape Processing (pp. 3-1-3-14). Meeting Proceedings RTO-MP-AVT-139, Paper 3. Neuilly-sur-Seine, France: RTO. Available from: http://www.rto.nato.int/abstracts.asp.*

(Continued)

*Primary Examiner* — Tien Dinh
*Assistant Examiner* — Alexander V Giczy
(74) *Attorney, Agent, or Firm* — Lorenz & Kopf LLP (57) ABSTRACT

An aircraft frame includes a first partial aircraft frame configured to be attached to a first aircraft fuselage segment, and a second partial aircraft frame configured to be attached to a second aircraft fuselage segment. The first and second partial aircraft frames include corresponding first and second stringer coupling sections. The first partial aircraft frame and the second partial aircraft frame are configured to be attached to each other via a first web and a second web. The first stringer coupling section is located between the first inner flange and the first outer flange and the second stringer coupling section is located between the second inner flange and the second outer flange. The first stringer coupling section includes a first wall which extends from the first web into the first section of the first partial aircraft frame, and the second stringer coupling section comprises a second wall, (Continued)

which extends from the second web into the second section of the second partial aircraft frame.

10 Claims, 3 Drawing Sheets

(56) References Cited

U.S. PATENT DOCUMENTS

| | | | |
|---|---|---|---|
| 8,302,909 B2 | 11/2012 | Cazeneuve et al. | |
| 2008/0067289 A1* | 3/2008 | Meyer | B64C 1/064 244/131 |
| 2009/0090813 A1* | 4/2009 | Telgkamp | B64C 1/068 244/117 R |
| 2011/0001010 A1* | 1/2011 | Tacke | B64C 1/061 244/131 |
| 2011/0179626 A1* | 7/2011 | Weber | B21J 15/14 29/428 |
| 2012/0132750 A1 | 5/2012 | Gorr et al. | |
| 2012/0186062 A1 | 7/2012 | Vera Villares et al. | |
| 2012/0228427 A1* | 9/2012 | Sayilgan | B64C 1/061 244/121 |
| 2013/0082143 A1* | 4/2013 | Storozuk | B64C 1/1446 244/129.5 |
| 2014/0117157 A1* | 5/2014 | Diep | B64C 1/12 244/120 |
| 2014/0151504 A1* | 6/2014 | Boyen | B64F 5/0009 244/120 |

OTHER PUBLICATIONS

Smill, Bill. Flying Paper Airplanes: A Science Fair Paper Presented to St. Jude of the Lake Middle School Science Fair. May 28, 2009. Accessed from http://www.stjude.venus.webaloo.com/files/stjude/files/teachers/sthompson/Science%20Fair/sample%20lab%20report.doc, on Aug. 31, 2015.*
European Patent Office, Extended European Search Report for 13152586.7 mailed Jul. 10, 2013.
Peoples Republic of China, Chinese Office Action for Chinese Application No. 201410036442.1 mailed Sep. 3, 2015.

\* cited by examiner

AIRCRAFT FRAME

CROSS-REFERENCE TO RELATED APPLICATIONS

This application claims priority to European Patent Application No. 13 152 586.7, filed Jan. 24, 2013, and to U.S. Provisional Patent Application No. 61/756,038, filed Jan. 24, 2013, which are each incorporated herein by reference in their entirety.

TECHNICAL FIELD

The technical field relates to an aircraft frame. In particular, the technical field relates to an aircraft frame which comprises a first partial aircraft frame and a second partial aircraft frame. The technical field also relates to an aircraft fuselage and to a method for mounting two aircraft fuselage segments together.

BACKGROUND

Currently, an orbital joint of two fuselage sections of an aircraft requires an assembly of a lot of single parts during joint assembly. This comprises the assembly of all necessary single parts for a structural junction of two sections in the main component assembly (MCA) or in the final assembly line (FAL). These assembly steps for an orbital joint involve extensive work like drilling, cleaning, burying and sealing for the permanent joint of aircraft fuselage segments in MCA or FAL, which extends the processing time.

Nowadays, a single aircraft frame built as one single component is connected with a first aircraft fuselage segment. Afterwards, the first aircraft fuselage segment, to which the aircraft frame is attached, is connected with a second aircraft fuselage segment by means of 282 mounting pieces. Said mounting pieces are attached to the single aircraft frame. The assembly of these 282 pieces and butt straps need a huge number of fasteners and requires extensive work which is time consuming and cost expensive.

In addition, other objects, desirable features and characteristics will become apparent from the subsequent summary and detailed description, and the appended claims, taken in conjunction with the accompanying drawings and this background.

SUMMARY

According to the various teachings of the present disclosure, provided is an improved assembly of an aircraft fuselage. In one embodiment, the present disclosure provides for an improved assembly of an aircraft fuselage.

The described embodiments similarly pertain to the aircraft frame, the aircraft fuselage and the method for attaching two aircraft fuselage segments together, although specific embodiments may be explained in detail in the following with respect to the aircraft frame, only. Synergetic effects may arise from different combinations of the embodiments although they might not be described in detail hereinafter.

According to an exemplary embodiment of the present disclosure, an aircraft frame, for example for connecting two aircraft fuselage segments, is provided. The aircraft frame comprises a first partial aircraft frame configured to be attached to a first aircraft fuselage segment and a second partial aircraft frame configured to be attached to a second aircraft fuselage segment. Therein, the first partial aircraft frame and the second partial aircraft frame are configured to be connected to each other to be in a connected configuration. Moreover, the first partial aircraft frame and the second partial aircraft frame are configured to establish the connected configuration such that the first fuselage segment and the second fuselage segment are connectable. Furthermore, the first partial aircraft frame and the second partial aircraft frame are configured to form, in the connected configuration, the aircraft frame. Hence, the first fuselage segment and the second fuselage segment are connectable by means of the connection, i.e. the connected configuration, of the two partial aircraft frames.

A central idea of the present disclosure is to realize a Final Assembly Line (FAL) with a minimized workload due to an easy installation of cabin components, an easy dismounting of the aircraft fuselage and a minimized number of connection parts. By having less manufacturing-constraints, a compact construction is realized which provides a topology-optimised, light-weight design and shape. Furthermore, the compact construction allows for multifunctional components such as the first and second partial aircraft frame due to huge integration of different functions into the components.

The first partial aircraft frame may be attached on the inside of the outer skin of the first aircraft fuselage segment and the second partial aircraft frame may be attached on the inside of the outer skin of the second aircraft fuselage segment. However, also other attaching configurations are possible.

Hereinafter, the term aircraft fuselage segment may also refer to an aircraft fuselage section. Furthermore, in the context of the present disclosure, the aircraft may be an airplane.

The aircraft frame comprising two partial aircraft frames may define a connection between two aircraft fuselage segments which connection optimizes the load flow of the aircraft fuselage and which connection receives bending loads from the aircraft fuselage and transmits said bending loads to the aircraft frame.

Moreover, the aircraft frame may expand along the complete circumference of the aircraft fuselage. It may thus be designed as a ring-shaped aircraft frame comprising two ring-shaped partial aircraft frames. Thus, each of the partial aircraft frames may expand over 360° of the circumference of the aircraft fuselage when viewed in a cross-section. Also, the aircraft frame may expand along a partial circumference of the aircraft fuselage, for example it may span over an angle of 30°, 60°, or 90°. However, also other angles are possible. In this case, the aircraft frame has the shape of a ring segment. The size of the aircraft frame may also depend on the panel size of the aircraft fuselage. The aircraft frame may comprise a bending with a radius which defines the shape of the aircraft fuselage. In other words, the aircraft frame forms a ring or a ring segment depending on the angle it covers.

With respect to terminology the following should be noted. Generally, an aircraft fuselage comprises a center point or a center axis along a longitudinal direction of the aircraft fuselage. The center axis may be used to define an inside and an outside of the aircraft frame. A first region of the aircraft frame, which is positioned closer to said center point or center axis than a second region of the aircraft frame is named to be positioned on the inside of the second region. Reciprocally, the second region is named to be on the outside of the first region. A first section of the aircraft frame which is positioned closer to said center point or center axis than a second section will be referred to as inner section and the second section will be referred to as outer section. Hence, the most inner part of the aircraft frame will be referred as inside and the most outer part of the aircraft frame will be referred as the outside of the aircraft frame.

Positively, the two-component aircraft frame concept of the present disclosure can be applied at various different positions along the longitudinal axis of an aircraft. Moreover, according to the concept of the present disclosure, the aircraft frame is constituted by the first and the second partial aircraft frame only. Furthermore, the first and the second partial aircraft frame are both embodied as two single but separated components.

The aircraft frame comprising a first partial aircraft frame and a second partial aircraft frame fulfills multiple functions. It provides the complete frame functionality of an aircraft frame and furthermore provides the function of connecting two aircraft fuselage segments with each other in the connected configuration of the first partial aircraft frame and the second partial aircraft frame. Furthermore, the aircraft frame provides for a sealing of a pressurized inner section of the aircraft fuselage to an unpressurized outer section of the aircraft fuselage. Hence the first partial aircraft frame and the second partial aircraft frame both are multifunctional components. In addition to said functions, the partial aircraft frames and/or multifunctional components may also provide for other additional functions as will be described with respect to the exemplary embodiments.

Compared to the conventional mounting method, the construction of the present disclosure reduces the number of single parts. The concept of two partial aircraft frames which are configured to be mounted to respective segments first and allow for a subsequent, later establishment of the aircraft frame by connecting the two partial aircraft frames is very advantageous for the assembly of the aircraft. This also reduces the effort and the processing time for assembling an aircraft fuselage which results in a cost reduction and facilitates the maintenance of an aircraft. In other words, the teaching of the present disclosure, namely to separate a conventional aircraft frame into a first and a second partial aircraft frame, provides for the possibility of attaching two aircraft fuselage segments together in a later stage in the assembly line and/or to choose another time sequence in the assembly of an aircraft fuselage.

According to an exemplary embodiment, the first partial aircraft frame is embodied as a single piece and the second partial aircraft frame is embodied as a single piece. In other words said partial aircraft frames are integrally formed, respectively.

Moreover, according to an exemplary embodiment, which can be combined with any other of the embodiments disclosed herein, each partial aircraft frame used to connect the first and second fuselage segment is itself embodied as a single piece/is integrally formed. For example, the partial aircraft frames 502 to 507 shown and explained in the context of FIG. 5 can be provided as a single piece, respectively. As will explained in the following, in an exemplary embodiment of the present disclosure the partial aircraft frames of the present disclosure are manufactured by added layer manufacturing (ALM). This allows, advantageously, for the possibility of manufacturing said partial aircraft frames as a single piece, respectively. Also other manufacturing methods may be used. Due to this single piece concept, no fixation means or attachment means like bolts or soldering parts are needed for the provision of the partial aircraft frame or partial aircraft frames. This may enhance the stability of the components and of the finally assembled aircraft frame leading to an increased security of the airplane.

According to an exemplary embodiment, the first partial aircraft frame is configured to receive and engage with a first stringer of the first aircraft fuselage segment and the second partial aircraft frame is configured to receive and engage with a second stringer of the second aircraft fuselage segment.

In other words, a first stringer of the first aircraft fuselage segment may be attached to the first partial aircraft frame and a second stringer of the second aircraft fuselage segment may be attached to the second partial aircraft frame. Hence, the aircraft frame provides for the possibility to transmit longitudinal forces of the aircraft fuselage from the stringers into the aircraft frame.

According to an exemplary embodiment of the present disclosure, the first partial aircraft frame comprises a first stringer coupling section and the second partial aircraft frame comprises a second stringer coupling section, wherein the stringer coupling sections are configured to receive longitudinal loads from an attached stringer and to transmit the longitudinal loads into the aircraft frame defined by the connected configuration of the first partial aircraft frame and the second partial aircraft frame.

The first stringer coupling may comprise a first corner blend for receiving the first stringer of the first aircraft fuselage segment. Equally, the second stringer coupling may comprise a second corner blend for receiving the second stringer of the first aircraft fuselage segment. The stringer may be attached to the stringer coupling section by means of an attachment element, for example a rivet.

According to an exemplary embodiment, the first partial aircraft frame including the first stringer coupling section is embodied as a single piece and the second partial aircraft frame including the second stringer coupling section is embodied as a single piece. In other words the first stringer coupling section is integrally formed with/within the first partial aircraft frame and the second stringer coupling section is integrally formed with/within the second partial aircraft frame. ALM is one possibility to manufacture such components but also other methods might be used.

According to an exemplary embodiment of the present disclosure, the first partial aircraft frame comprises a first outer flange, a first web, and a first inner flange defining a first section of the first partial aircraft frame and the second partial aircraft frame comprises a second outer flange, a second web, and a second inner flange defining a second section of the second partial aircraft frame, wherein the first partial aircraft frame and the second partial aircraft frame are configured to be attached to each other via the first web and the second web.

In other words, the first outer flange, the first web, and the first inner flange of the first partial aircraft frame partially extend around and spatially define a first section of the first partial aircraft frame which is positioned between the first outer flange and first inner flange. Equally, the second outer flange, the second web, and the second inner flange of the second partial aircraft frame partially extend around and spatially define a second section of the second partial aircraft frame which is positioned between the second outer flange and the second inner flange.

The first outer flange of the first partial aircraft frame and the second outer flange of the second partial aircraft frame are arranged to be attached to the aircraft fuselage segments. For example, the first outer flange comprises a region that is arranged to be in a mechanical contact with an inside of a skin of the first aircraft fuselage segment and to be attached to the inside of the skin of the first aircraft fuselage segment. Equally, the second outer flange comprises a region that is arranged to be in a mechanical contact with an inside of a skin of the second aircraft fuselage segment and to be attached to the inside of the skin of the second aircraft fuselage segment.

According to an exemplary embodiment of the present disclosure, the first partial aircraft frame further comprises a first stringer coupling section configured to receive and engage with a first stringer of the first aircraft fuselage segment and the second partial aircraft frame further comprises a second stringer coupling section configured to receive and engage with a second stringer of the second aircraft fuselage segment. The first stringer coupling section is located between the first inner flange and the first outer flange and the second stringer coupling section is located between the second inner flange and the second outer flange.

In other words, the first stringer coupling section is located in the first section of the first partial aircraft frame and the second stringer coupling section is located in the second section of the second partial aircraft frame.

According to an exemplary embodiment, the first stringer coupling section comprises a first wall which extends from the first web into the first section of the first partial aircraft frame. Furthermore, the second stringer coupling section comprises a second wall, which extends from the second web into the second section of the second partial aircraft frame.

Hence, the first wall also extends from the first outer flange to the first inner flange of the partial aircraft frame and defines a first receiving section for a first stringer of the first aircraft fuselage segment. Equally, the second wall also extends from the second outer flange to the second inner flange of the second partial aircraft frame and defines a second receiving section for a second stringer of the second aircraft fuselage segment. In other words, the first wall is partially surrounded by the first outer flange, the first web and the first inner flange of the first partial aircraft frame and the second wall is partially surrounded by the second outer flange, the second web and the second inner flange of the second partial aircraft frame. Hence, the first wall defines an elongation of a first stringer of the first aircraft fuselage segment and the second wall defines an elongation of a second stringer of the second aircraft fuselage segment. These walls are configured to receive longitudinal loads from a stringer and to transmit these longitudinal loads to the aircraft frame.

According to an exemplary embodiment of the present disclosure, the first web of the first partial aircraft frame extends substantially perpendicularly from the first outer flange to the first inner flange of the first partial aircraft frame, wherein the first outer flange, the first inner flange, and the first web define a substantially U shaped cross section. Furthermore, the second web of the second partial aircraft frame extends substantially perpendicularly from the second outer flange to the second inner flange of the second partial aircraft frame, wherein the second outer flange, the second inner flange, and the second web define a substantially U shaped cross section.

According to an exemplary embodiment, the first partial aircraft frame and the second partial aircraft frame are manufactured by added layer manufacturing (ALM).

By using ALM, it is possible to produce compact and light-weight components. Moreover, the added layer manufacturing method offers a possibility to manufacture stable partial aircraft frames which, in the connected configuration, fulfill all essential functionalities of a conventional aircraft frame. Furthermore, the height of the partial aircraft frame can be reduced by using ALM, such that large levers and large secondary bending loads may be reduced. This can be gathered from FIG. 1 which is a cross section of an exemplary embodiment. Therein, the height of the partial aircraft frame refers to the distance perpendicular to the outer flange of the most inner point of the partial aircraft frame to the most outer point of the partial aircraft frame. ALM also provides for the possibility to save material and thus to save costs and weight. Furthermore, with ALM partial aircraft frames may be manufactured, such that regions of the partial aircraft frames with high loads are built with massive material and regions with low loads are built with less material, for example comprising recesses or hollow spaces, in order to save material, weight, and/or costs. Moreover, ALM allows for manufacturing specific partial aircraft frames, which may be designed for specific load transmittal for example.

Alternatively, the first partial aircraft frame and the second partial aircraft frame may also be manufactured by means of casting methods.

According to an exemplary embodiment a production of partial aircraft frames by ALM is presented.

According to an exemplary embodiment of the present disclosure, the first partial aircraft frame and the second partial aircraft frame comprise a material chosen from the group comprising aluminum, scandium, titanium, carbon-fiber-reinforced materials, or any combination thereof.

Using such material further provides the possibility to reduce the weight of the partial aircraft frames.

According to an exemplary embodiment, the second partial aircraft frame further comprises a bulkhead coupling section, wherein the bulkhead coupling section is configured to be attached to a pressure bulkhead.

The pressure bulkhead ensures the sealing of the pressurized inner fuselage section to the outer unpressurized fuselage section. The pressure bulkhead may be attached to the coupling section by means of an attachment element, for example a rivet. By including the bulkhead coupling section into the partial aircraft frame the number of single parts is reduced compared to the conventional bulkhead coupling. This also reduces weight and processing time for aircraft fuselage mounting. Because of the compact shape of the partial aircraft frame, it is possible to locate the bulkhead coupling section close to the outer skin of the aircraft fuselage segment. This reduces the lever for the force applied by the pressure bulkhead and reduces secondary bending effects. In particular, for aircraft fuselage segments where the bulkhead is conventionally attached, the assembly is work intensive and the concept of the present disclosure provides for an increased work reduction during assembly.

According to an exemplary embodiment, the bulkhead coupling section is embodied as a third inner flange of the second partial aircraft frame, wherein the third inner flange of the second partial aircraft frame is arranged on an inside of the second inner flange of the second partial aircraft frame.

In other words, the third inner flange is located further away from the skin of the aircraft fuselage segment compared to the second inner flange of the second partial aircraft frame. Equally, the third inner flange is located closer to the center point or center axis of the fuselage than the second inner flange of the second partial aircraft frame.

According to an exemplary embodiment of the present disclosure, the second inner flange of the second partial aircraft frame comprises a recess, wherein the recess is arranged between the second stringer coupling section and a fourth stringer coupling section of the second partial aircraft frame.

This embodiment provides for a better accessibility for attaching the pressure bulkhead to the bulkhead coupling section of the second partial aircraft frame. Thus, time and money during assembly is saved.

According to an exemplary embodiment, an aircraft fuselage comprising a first aircraft fuselage segment with a first partial aircraft frame and a second aircraft fuselage segment with a second partial aircraft frame is provided. Therein the first and the second partial aircraft frame are connected to each other to be in a connected configuration. The first partial aircraft frame and the second partial aircraft frame form an aircraft frame in the connected configuration and the first aircraft fuselage segment and the second aircraft fuselage segment are connected to each other by the connected configuration of the first partial aircraft frame and the second partial aircraft frame to each other.

In particular, the aircraft fuselage according to this exemplary embodiment is in an assembled state. Due to the separation of an aircraft frame into a first and a second partial aircraft frame, time and money was saved during the assembly of the aircraft fuselage. The first partial aircraft frame may be attached to the first aircraft fuselage segment by means of an attachment element, for example a rivet and the second partial aircraft frame may be attached to the second aircraft fuselage segment by means of an attachment element, for example a rivet.

According to an exemplary embodiment, the first partial aircraft frame receives and engages with a first stringer of the first aircraft fuselage segment and the second partial aircraft frame receives and engages with a second stringer of the second aircraft fuselage segment. Hence, the first aircraft fuselage segment may be attached to the second aircraft fuselage segment by means of the attachment of the first stringer to the first partial aircraft frame and the attachment of the second stringer to the second partial aircraft frame and the attachment of the first partial aircraft frame to the second partial aircraft frame.

According to an exemplary embodiment of the present disclosure, the first partial aircraft frame and the second partial aircraft frame are connected by means of an attachment element.

The attachment element may be a tension bolt. Furthermore, the attachment element may be a reversible attachment element, such that the two aircraft fuselage segments may be separated for example for heavy maintenance action or in order to renew the cabin interior or to replace an aircraft fuselage segment with another aircraft fuselage segment.

According to an exemplary embodiment, the first partial aircraft frame comprises a first outer flange, a first web, and a first inner flange defining a first section of the first partial aircraft frame and the second partial aircraft frame comprises a second outer flange, a second web, and a second inner flange defining a second section of the second partial aircraft frame, wherein the first partial aircraft frame and the second partial aircraft frame are attached to each other via the first web and the second web.

According to an exemplary embodiment, the first outer flange of the first partial aircraft frame is attached to the first aircraft fuselage segment by means of an attachment element and the second outer flange of the second partial aircraft frame is attached to the second aircraft fuselage segment by means of an attachment element.

For example, the first outer flange of the first partial aircraft frame is attached on the inside of the outer skin of the first aircraft fuselage segment and the second outer flange of the second partial aircraft frame is attached on the inside of the outer skin of the second aircraft fuselage segment. This attachment may be provided by means of an attachment element, for example a rivet.

According to an exemplary embodiment of the present disclosure, a method for mounting two aircraft fuselage segments together is provided. The method comprises attaching a first aircraft fuselage segment to a first partial aircraft frame and attaching a second aircraft fuselage segment to a second partial aircraft frame. The method further comprises connecting the first partial aircraft frame to the second partial aircraft frame to establish a connected configuration, thereby providing for an aircraft frame built from the first partial aircraft frame and the second partial aircraft frame, wherein the first aircraft fuselage segment is connected to the second aircraft fuselage segment by the first partial aircraft frame and the second partial aircraft frame. In particular, the mounting of two aircraft fuselage segments may be done during MCA or FAL.

According to an exemplary embodiment, a method for attaching two aircraft fuselage segments together is provided, wherein the method is executed in the following time sequence. Firstly, a first aircraft fuselage segment is attached to a first partial aircraft frame. Subsequently a second aircraft fuselage segment is attached to a second partial aircraft frame. Finally, the first partial aircraft frame is connected with or attached to the second partial aircraft frame to establish a connected configuration, thereby providing for an aircraft frame consisting of the first partial aircraft frame and the second partial aircraft frame. Therein, the first aircraft fuselage segment is connected to the second aircraft fuselage segment by the first partial aircraft frame and the second partial aircraft frame.

According to an exemplary embodiment, the method further comprises attaching the first partial aircraft frame to a first stringer of the first aircraft frame segment and attaching the second partial aircraft frame to a second stringer of the second aircraft frame segment.

According to an exemplary embodiment of the present disclosure, the partial aircraft frames as presented herein before are embodied as a single piece, respectively.

The gist of the various teachings of the present disclosure may be seen in providing for a modular concept of an aircraft frame, which aircraft frame is provided in a two part form. By mounting two partial aircraft frames together the full frame functionality of a conventional one part frame is delivered by the present disclosure. In other words, the present disclosure teaches to cut or divide a conventional aircraft frame into two pieces, which allows for an improved and advantageous assembly.

A person skilled in the art can gather other characteristics and advantages of the disclosure from the following description of exemplary embodiments that refers to the attached drawings, wherein the described exemplary embodiments should not be interpreted in a restrictive sense

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

The exemplary embodiments show an aircraft frame comprising two partial aircraft frames, which are for example manufactured by ALM technology. This enables a fast and reversible closed orbital joint of two aircraft fuselage segments by tension bolts without large workload at the FAL. The two partial aircraft frames have been assembled in the MCA before, defining the shape of the aircraft fuselage segment. This is possible due to very low tolerances of the ALM technology. Two partial aircraft frames already comprise integrated corner blends for stringer coupling and a section for the attachment of the rear pressure bulkhead, which highly reduces the workload at the MCA. Due to the ALM technology, the height and/or cross section of the partial aircraft frames may be reduced to a minimum. The residual height is driven by the minimal height necessary for the skin frame fastening, the stringer coupling, or the pressure bulkhead attachment. Due to the reduced height of the partial aircraft frames, an optimized load flow for the pressure bulkhead attachment is achieved. This results in reduced secondary bending effects and therefore in an optimized and/or reduced component weight. This weight reduction is also enlarged by the removal of overlapping of several attachment parts for the assembly. Due to the reduction of single parts, a visual inspection is made easier and also the risk of corrosion in critical areas is reduced due to better drainability.

Figure 1:
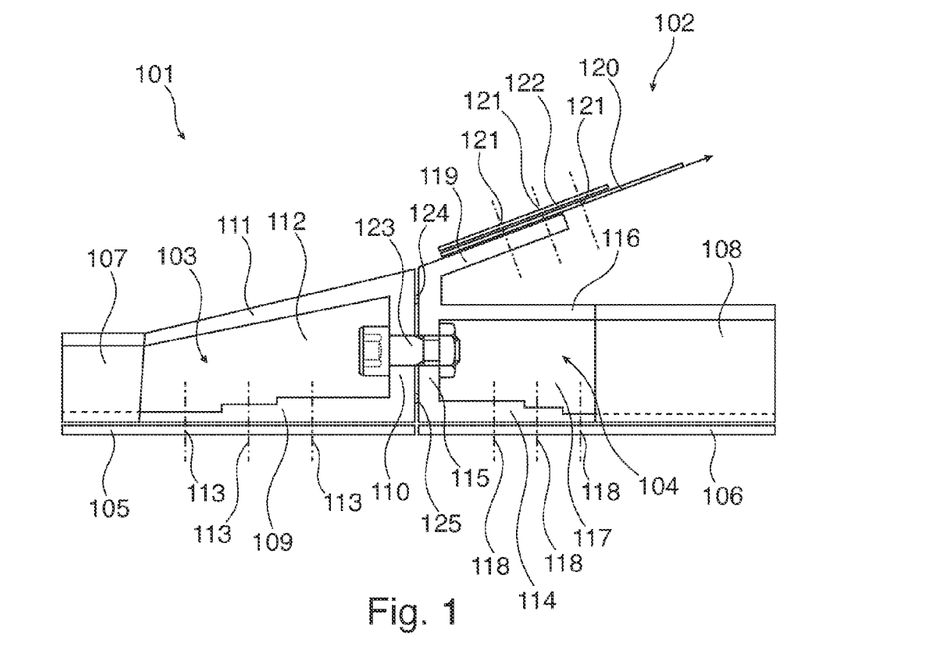
FIG. 1 is a schematic cross section of an aircraft frame according to an exemplary embodiment of the present disclosure.
Figure 2:
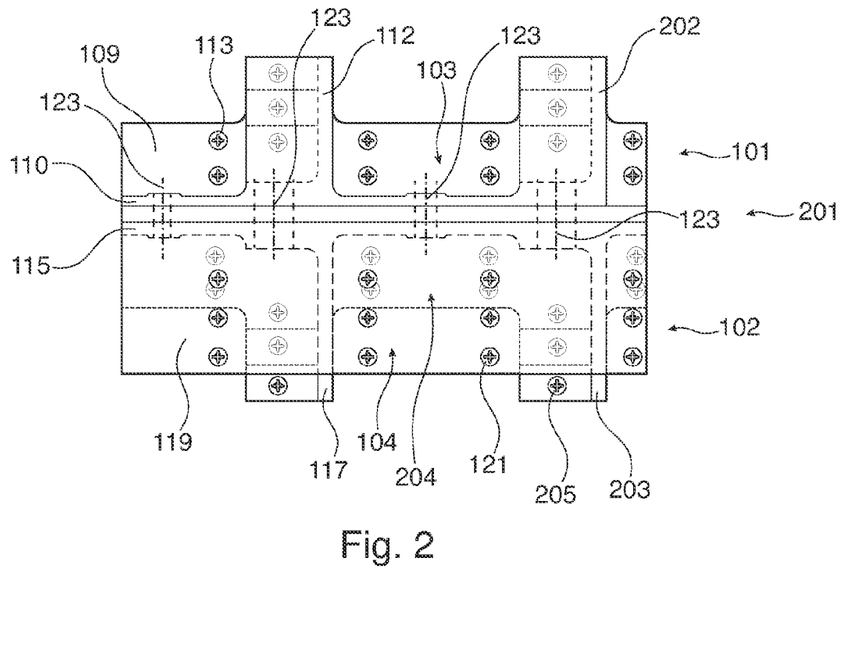
FIG. 2 is a schematic top view of an aircraft frame according to an exemplary embodiment of the present disclosure.

FIG. 1 shows a cross section of an aircraft frame according to an exemplary embodiment of the present disclosure. FIG. 2 shows a schematic top view of an aircraft frame according to the same embodiment of the present disclosure. The aircraft frame 201 comprises a first partial aircraft frame 103 and a second partial aircraft frame 104. The first partial aircraft frame 103 is attached to a section of an external skin 105 of a first partial aircraft fuselage segment 101. The second partial aircraft frame 104 is connected to a section of an external skin 106 of a second aircraft fuselage segment 102. The attachment elements of the first partial aircraft frame 103 to the external skin 105 of the first aircraft fuselage section 101 are illustrated with dashed lines 113. The attachment elements 113 may be embodied for example as rivets. Equally, the attachment elements of the second partial aircraft frame to the section of the outer skin of the second fuselage segment 102 are illustrated as dashed lines 118. These attachment elements may also be embodied as rivets. The first partial aircraft frame 103 comprises a first outer flange 109, a first web 110, and a first inner flange 111.

The first outer flange comprises a section i.e. an outer surface which outer surface is in mechanical contact with an inside of an outer skin section 105 of the first aircraft fuselage segment 101. The web 110 is arranged substantially perpendicularly to the first outer flange 109. The first inner flange 111 extends from the first web 110 and is arranged above the first outer flange 109, such that the first outer flange 109, the first web 110, and the first inner flange 111 define a substantially U shaped cross section. The first outer flange 109, the first web 110, and the first inner flange 111 partially surround a first section of the first partial aircraft frame.

Furthermore, the first partial aircraft frame 103 comprises a first stringer coupling section 112 and third stringer coupling section 202. The stringer coupling sections 112 and 202 comprise walls which extend from the first web 110 into the first inner section of the first partial aircraft frame 103 and are located between the first outer flange 109 and the first inner flange 111. For example, these walls are arranged substantially perpendicularly to the first web 110 and substantially perpendicularly to the first outer flange 109 and the first inner flange 111. The first stringer coupling 112 is attached to a first stringer 107, for example by means of rivets. In this manner, longitudinal loads of the stringer 107 may be received and transmitted to the aircraft frame 201. The first stringer 107 is part of the first fuselage segment 101.

The second partial aircraft frame 104 comprises a second outer flange 114, a second web 115 and a second inner flange 116. The second outer flange comprises a section which is in mechanical contact with an inside of an outer skin of the second aircraft fuselage segment 102. The second web 115 is located substantially perpendicularly to the second outer flange 114. The second inner flange extends substantially perpendicularly from the second web 115 and is located above the second outer flange 114 such that the second outer flange 114, the second web 115 and the second inner flange 116 define a substantially U shaped cross section. The second outer flange 114, the second web 115, and the second inner flange 116 partially surround a second section of the second partial aircraft frame. The second partial aircraft frame comprises a second stringer coupling section 117 and a fourth stringer coupling section 203. The stringer coupling sections 117 and 203 comprise walls which extend from the second web 115 into the second section of the second partial aircraft frame 104 and are located between the second outer flange 114 and the second inner flange 116. For example, the walls are arranged substantially perpendicularly to the second web 115, to the outer flange 114, and to the inner flange 116. The stringer coupling section 117 is attached to a stringer 108 of the second aircraft fuselage segment 102, for example by means of rivets. In this way, longitudinal loads of the stringers are received and transmitted to the aircraft frame 201.

As can be gathered from FIGS. 1 and 2, the first partial aircraft frame 103 including the first stringer coupling section 112 is embodied as a single piece and the second partial aircraft frame 104 including the second stringer coupling section 117 is embodied as a single piece. Therefore, the first stringer coupling section 112 is integrally formed with/within the first partial aircraft frame 103 and the second stringer coupling section 117 is integrally formed with/within the second partial aircraft frame 104.

Furthermore, the second partial aircraft frame 104 comprises a coupling section 119 for a pressure bulkhead 120. The pressure bulkhead coupling section 119 comprises a third inner flange 119 which is arranged on the inside of the second inner flange 116. As before, the outside refers to sections which are closer to the external skin of the aircraft fuselage and the inside refers to sections which are further away from the outer skin of the aircraft fuselage. The third inner flange 119 and the second inner flange 116 enclose an angle, which is approximately 30°. However, other values for this angle may be realized in other embodiments. The pressure bulkhead 120 is attached to the pressure bulkhead coupling section 119 by means of rivets which are illustrated with dashed lines 121. Furthermore, the pressure bulkhead is reinforced with a doubler in the region of the attachment to the pressure bulkhead coupling section 119. This allows for a visual inspection of fatigue critical areas at the bulkhead attachment. The bulkhead attachment by means of rivets 121 is located between the stringers 117 and 203. Furthermore, the second inner flange 116 comprises a recess 204 between the second stringer coupling 117 and the fourth stringer coupling 203. This allows for a better accessibility to the pressure bulkhead attachment 121. The first inner belt 111 of the first partial aircraft frame 103 and the third inner belt 119 of the second partial aircraft frame 104 are arranged in such a way that the first inner belt 111 defines an elongation of the third inner belt 119 and vice versa.

The first partial aircraft frame 103 is attached to the second partial aircraft frame 104 by means of an attachment element 123, for example a tension bolt. Other attachment means may also be applied without deriving from the scope of the present disclosure. In particular, the attachment element 123 is designed to be reversible such that it may be released again. In that manner, it is possible to separate two aircraft fuselage segments for maintenance or for the replacement of an aircraft fuselage segment with another aircraft fuselage segment in a simplified and cost effective way. Between the first web 110 of the first partial aircraft frame 103 and the second web 115 of the second partial aircraft frame 104, a first sealing element 124 and a second sealing element 125 are positioned. The sealing elements 124 and 125 may be embodied, for example, as sealing rings.

FIG. 2 shows top view of an aircraft frame 201 according to the same embodiment as FIG. 1. The solid lines in FIG. 2 illustrate the parts which are visible from the inside of the aircraft fuselage, which are the parts that are visible from the center point of the aircraft fuselage. The dashed lines show parts of the partial aircraft frames which are hidden due to an overlaying part of the partial aircraft frames. For example, since the third inner belt 119 is closer to the center point of the aircraft fuselage, all subjacent parts are shown with dashed lines. The embodiment of FIG. 2 provides for a modular concept of an aircraft frame 201, which aircraft frame comprises a first and a second partial aircraft frame 103 and 104. By mounting two partial aircraft frames 103 and 104 together the full frame functionality of a conventional one part frame is realized. In other words, the present disclosure teaches to cut or divide a conventional aircraft frame into two pieces, which allows for an improved and advantageous assembly.

Figure 3:
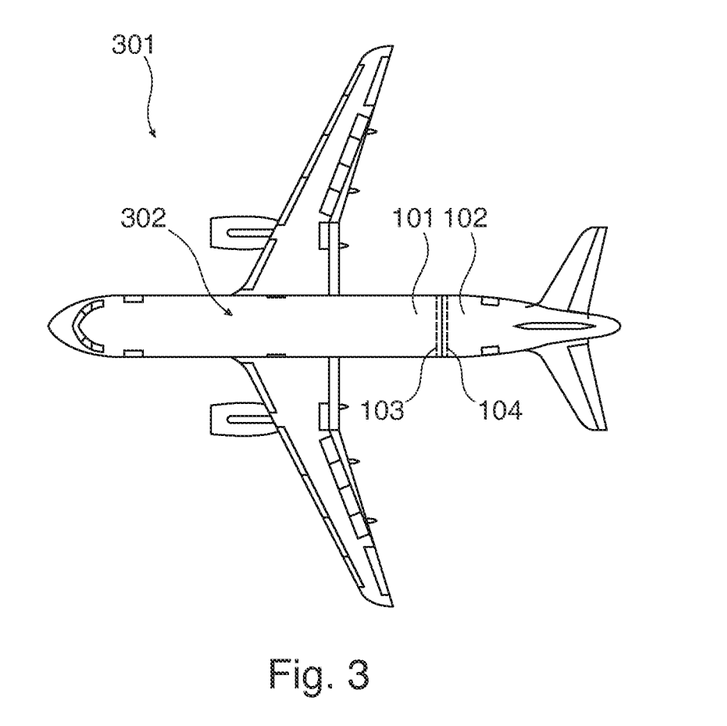
FIG. 3 is a schematic top view of an aircraft according to an exemplary embodiment of the present disclosure.

FIG. 3 is a schematic top view of an aircraft 301 according to an exemplary embodiment. The aircraft 301 comprises an aircraft fuselage 302 with a first aircraft fuselage segment 101 and a second aircraft fuselage segment 102. The first aircraft fuselage segment comprises a first aircraft fuselage section typically named Section 18 and the second aircraft fuselage segment 102 comprises a second aircraft fuselage section typically named Section 19. In this embodiment, the rear pressure bulkhead is attached between Section 18 and Section 19. The first aircraft fuselage segment 101 comprises a first partial aircraft frame 103 and a second aircraft fuselage segment 102 comprises a second partial aircraft frame 104. The first partial aircraft frame 103 and the second partial aircraft frame 104 are attached together to form a connected configuration in which they define the aircraft frame 201. Hence, the first and the second fuselage segments are connected by the first and the second partial aircraft frame only.

Figure 4:
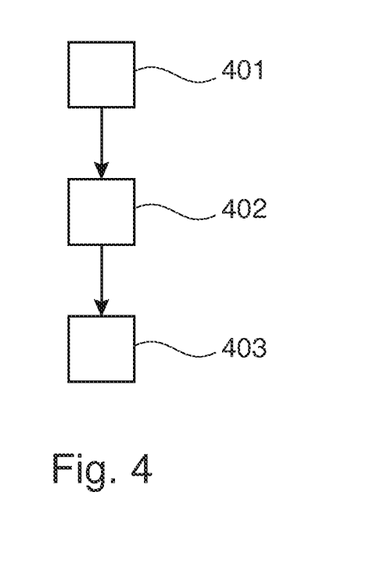
FIG. 4 shows a flowchart according to an exemplary embodiment of the present disclosure.
Figure 6:
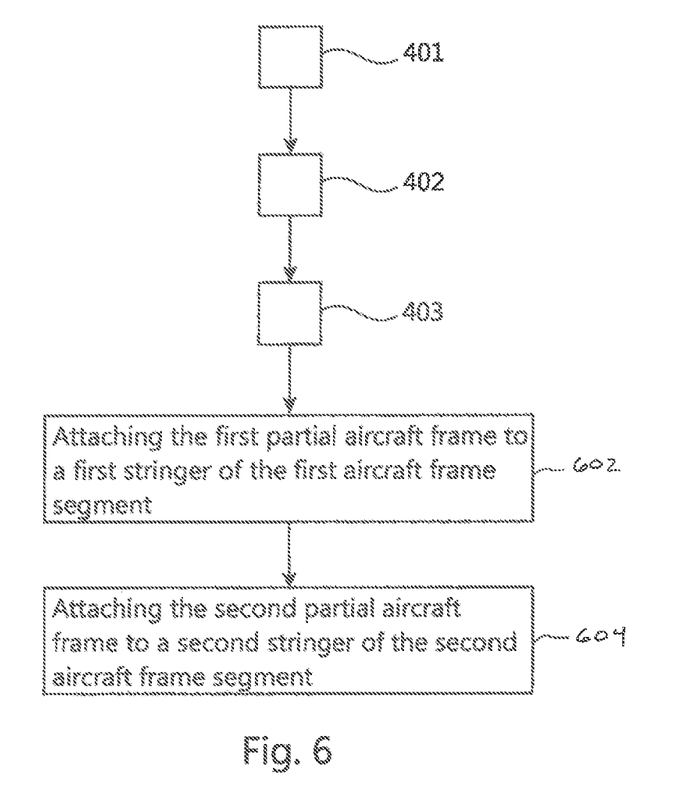
FIG. 6 shows a flowchart according to an exemplary embodiment of the present disclosure.

FIG. 4 shows a flowchart for a method for mounting two aircraft fuselage segments together according to an exemplary embodiment. For example, this method is performed during the MCA and the FAL. In 401, a first aircraft fuselage segment is attached to a first partial aircraft frame. In 402, a second aircraft fuselage segment is attached to a second partial aircraft frame. Finally, in 403, the first partial aircraft frame and the second partial aircraft frame are connected to establish a connected configuration, thereby providing for an aircraft frame built from the first partial aircraft frame and the second partial aircraft frame, wherein the first aircraft fuselage segment is connected to the second aircraft fuselage segment by the first partial aircraft frame and the second partial aircraft frame in the connected configuration. The steps of the method may be repeated several times in order to connect and/or to attach multiple aircraft fuselage segments with each other. Such a frame comprising a first partial frame and a second partial frame is not restricted for the use in an aircraft fuselage. It may also be used to attach two wing segments of an aircraft with each other. Referring briefly to FIG. 6, the method might further include attaching the first partial aircraft frame to a first stringer of the first aircraft frame segment (602) and attaching the second partial aircraft frame to a second stringer of the second aircraft frame segment (604).

Figure 5:
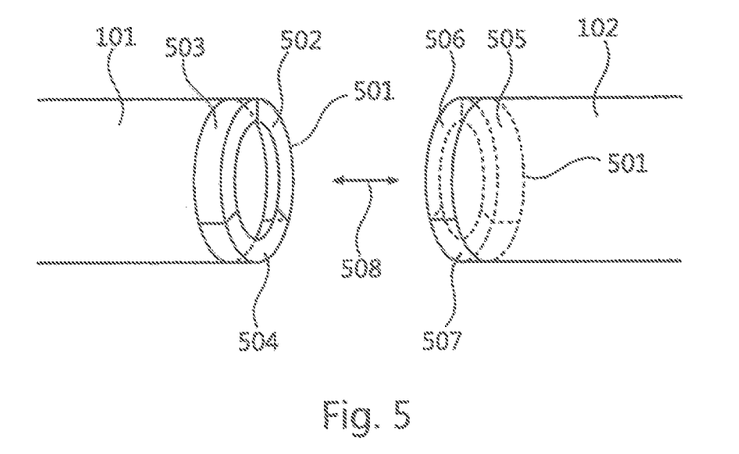
FIG. 5 shows an aircraft frame comprising a first partial aircraft frame and a second partial aircraft frame according to an exemplary embodiment of the present disclosure.

FIG. 5 shows a first aircraft fuselage segment 101 and a second aircraft fuselage segment 102 according to an exemplary embodiment. Both aircraft fuselage segments 101 and 102 are configured to be attached together by means of an aircraft frame 501. The concept underlying the present disclosure may be seen in providing an aircraft frame 501 in a separated form, i.e. by providing a first partial aircraft frame 502 and a second partial aircraft frame 505. The first partial aircraft frame 502 is connected with the first aircraft fuselage segment 101 and the second partial aircraft frame is 505 is connected with the second aircraft fuselage segment 102. The first partial aircraft frame 502 and the second partial aircraft frame 505 are configured to be connected to each other to be in a connected configuration such that the first fuselage segment 101 and the second fuselage segment 102 are connected to build a complete fuselage. The process of connecting the first partial aircraft frame 502 and the second partial aircraft frame to each other is indicated by the arrow 508. In said connected configuration, the first partial aircraft frame 502 and the second partial aircraft frame 505 form the aircraft frame 501. In this exemplary embodiment of the present disclosure the partial aircraft frames 502 and 505 expand along a partial circumference of the aircraft fuselage and the partial aircraft frames 502 and 505 each cover approximately an angle of 120°. Hence, the first fuselage segment 101 is attached to three partial aircraft frames 502, 503, and 504 and the second fuselage segment 102 is attached to three partial aircraft frames 505, 506, and 507. Moreover, the partial aircraft frame 503 is configured to be connected to the partial aircraft frame 506 and the partial aircraft frame 504 is configured to be connected to the partial aircraft frame 507.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An aircraft frame comprising:
a first partial aircraft frame configured to be attached to a first aircraft fuselage segment; and
a second partial aircraft frame configured to be attached to a second aircraft fuselage segment, the first partial aircraft frame and the second partial aircraft frame configured to be connected to each other to be in a connected configuration, and the first partial aircraft frame and the second partial aircraft frame are configured to establish the connected configuration such that the first fuselage segment and the second fuselage segment are connectable;
wherein the first partial aircraft frame and the second partial aircraft frame are configured to form the aircraft frame in the connected configuration;
wherein the first partial aircraft frame comprises a first stringer coupling section, and the second partial aircraft frame comprises a second stringer coupling section;
wherein the first stringer coupling section is integrally formed within the first partial aircraft frame and the second stringer coupling section is integrally formed within the second partial aircraft frame;
wherein the first stringer coupling section is configured to receive and engage with a first stringer of the first aircraft fuselage segment and to receive longitudinal loads from the first stringer attached to the first stringer coupling section;
wherein the second stringer coupling section is configured to receive and engage with a second stringer of the second aircraft fuselage segment and to receive longitudinal loads from the second stringer attached to the second stringer coupling section;
wherein the first partial aircraft frame comprises a first outer flange, a first web, and a first inner flange defining a first section of the first partial aircraft frame, and the second partial aircraft frame comprises a second outer flange, a second web, and a second inner flange defining a second section of the second partial aircraft frame;
wherein the first partial aircraft frame and the second partial aircraft frame are configured to be attached to each other via the first web and the second web;
wherein the first stringer coupling section is located between the first inner flange and the first outer flange and the second stringer coupling section is located between the second inner flange and the second outer flange; and
wherein the first stringer coupling section comprises a first wall which extends from the first web into the first section of the first partial aircraft frame, and the second stringer coupling section comprises a second wall, which extends from the second web into the second section of the second partial aircraft frame.

2. The aircraft frame according to claim 1, wherein the first and second stringer coupling sections are configured to transmit the longitudinal loads from the first and second stringers into the aircraft frame defined by the connected configuration of the first partial aircraft frame and the second partial aircraft frame.

3. The aircraft frame according to claim 1, wherein the first partial aircraft frame and the second partial aircraft frame are manufactured by added layer manufacturing.

4. The aircraft frame according to claim 1, wherein the second partial aircraft frame further comprises a bulkhead coupling section, and the bulkhead coupling section is configured to be attached to a pressure bulkhead.

5. The aircraft frame according to claim 4, wherein the bulkhead coupling section is embodied as a third inner flange of the second partial aircraft frame, and the third inner flange of the second partial aircraft frame is arranged on an inside of the second inner flange of the second partial aircraft frame.

6. The aircraft frame according to claim 1, wherein the second inner flange of the second partial aircraft frame comprises a recess, and the recess is arranged between the second stringer coupling section and a fourth stringer coupling section of the second partial aircraft frame.

7. An aircraft fuselage comprising:
a first aircraft fuselage segment with a first partial aircraft frame; and
a second aircraft fuselage segment with a second partial aircraft frame, the first and the second partial aircraft frames connected to each other in a connected configuration and the first partial aircraft frame and the second partial aircraft frame in the connected configuration form an aircraft frame;
wherein the first aircraft fuselage segment and the second aircraft fuselage segment are connected to each other by the connected configuration of the first partial aircraft frame and the second partial aircraft frame, and the first partial aircraft frame receives and engages with a first stringer of the first aircraft fuselage segment;
wherein the first partial aircraft frame comprises a first stringer coupling section, and the second partial aircraft frame comprises a second stringer coupling section;
wherein the first stringer coupling section is integrally formed within the first partial aircraft frame and the second stringer coupling section is integrally formed within the second partial aircraft frame;
wherein the first stringer coupling section is configured to receive and engage with a first stringer of the first aircraft fuselage segment and to receive longitudinal loads from the first stringer attached to the first stringer coupling section; and
wherein the second stringer coupling section is configured to receive and engage with a second stringer of the second aircraft fuselage segment and to receive longitudinal loads from the second stringer attached to the second stringer coupling section;
wherein the first partial aircraft frame comprises a first outer flange, a first web, and a first inner flange defining a first section of the first partial aircraft frame, and the second partial aircraft frame comprises a second outer flange, a second web, and a second inner flange defining a second section of the second partial aircraft frame;

wherein the first partial aircraft frame and the second partial aircraft frame are attached to each other via the first web and the second web;

wherein the first stringer coupling section is located between the first inner flange and the first outer flange and the second stringer coupling section is located between the second inner flange and the second outer flange; and wherein the first stringer coupling section comprises a first wall which extends from the first web into the first section of the first partial aircraft frame, and the second stringer coupling section comprises a second wall, which extends from the second web into the second section of the second partial aircraft frame.

8. The aircraft fuselage according to claim 7, wherein the first outer flange of the first partial aircraft frame is attached to the first aircraft fuselage segment by means of a first attachment element, and the second outer flange of the second partial aircraft frame is attached to the second aircraft fuselage segment by means of a second attachment element.

9. A method for mounting two aircraft fuselage segments together, the method comprising the steps of:

attaching a first aircraft fuselage segment to a first partial aircraft frame;

attaching a second aircraft fuselage segment to a second partial aircraft frame;

connecting the first partial aircraft frame and the second partial aircraft frame to establish a connected configuration to provide an aircraft frame constituted by the first partial aircraft frame and the second partial aircraft frame, and connecting the first aircraft fuselage segment to the second aircraft fuselage segment by the first partial aircraft frame and the second partial aircraft frame;

wherein the first partial aircraft frame comprises a first stringer coupling section, and the second partial aircraft frame comprises a second stringer coupling section;

wherein the first stringer coupling section is integrally formed within the first partial aircraft frame and the second stringer coupling section is integrally formed within the second partial aircraft frame;

wherein the first stringer coupling section is configured to receive and engage with a first stringer of the first aircraft fuselage segment and to receive longitudinal loads from the first stringer attached to the first stringer coupling section; and wherein the second stringer coupling section is configured to receive and engage with a second stringer of the second aircraft fuselage segment and to receive longitudinal loads from the second stringer attached to the second stringer coupling section;

wherein the first partial aircraft frame comprises a first outer flange, a first web, and a first inner flange defining a first section of the first partial aircraft frame, and the second partial aircraft frame comprises a second outer flange, a second web, and a second inner flange defining a second section of the second partial aircraft frame;

wherein the first partial aircraft frame and the second partial aircraft frame are configured to be attached to each other via the first web and the second web;

wherein the first stringer coupling section is located between the first inner flange and the first outer flange and the second stringer coupling section is located between the second inner flange and the second outer flange; and wherein the first stringer coupling section comprises a first wall which extends from the first web into the first section of the first partial aircraft frame, and the second stringer coupling section comprises a second wall, which extends from the second web into the second section of the second partial aircraft frame.

10. The method according to claim 9, further comprising the steps of:

attaching the first partial aircraft frame to the first stringer of the first aircraft frame segment, and attaching the second partial aircraft frame to the second stringer of the second aircraft frame segment.

* * * * *